March 24, 1931.    J. HORSTE    1,797,957
DRIVING ATTACHMENT FOR TRACTORS
Filed Nov. 19, 1928    2 Sheets-Sheet 2
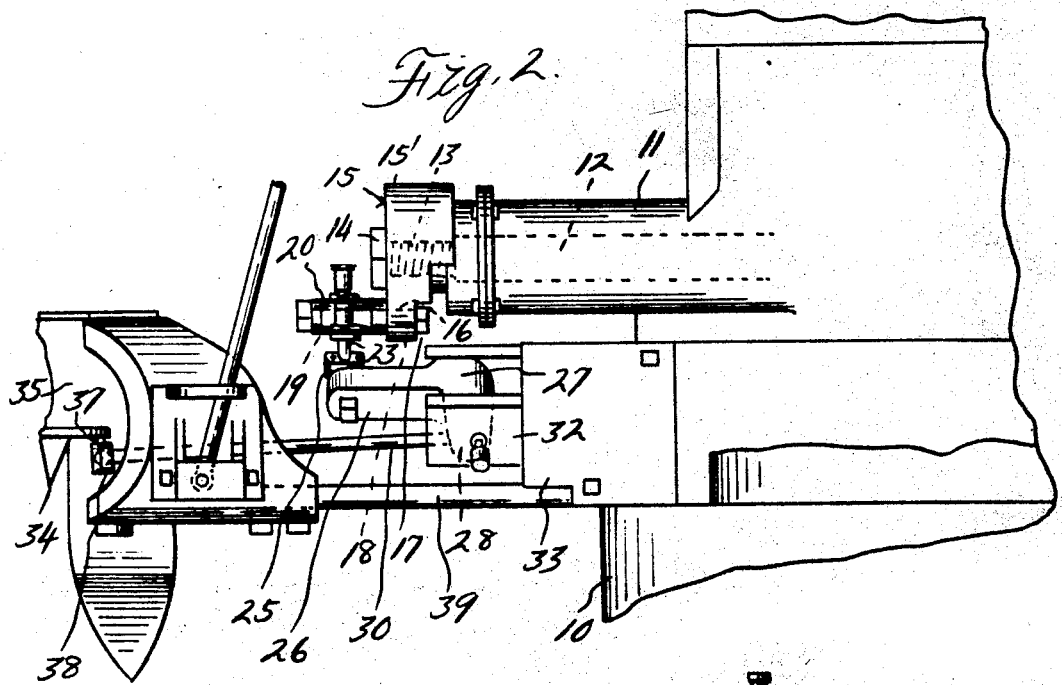
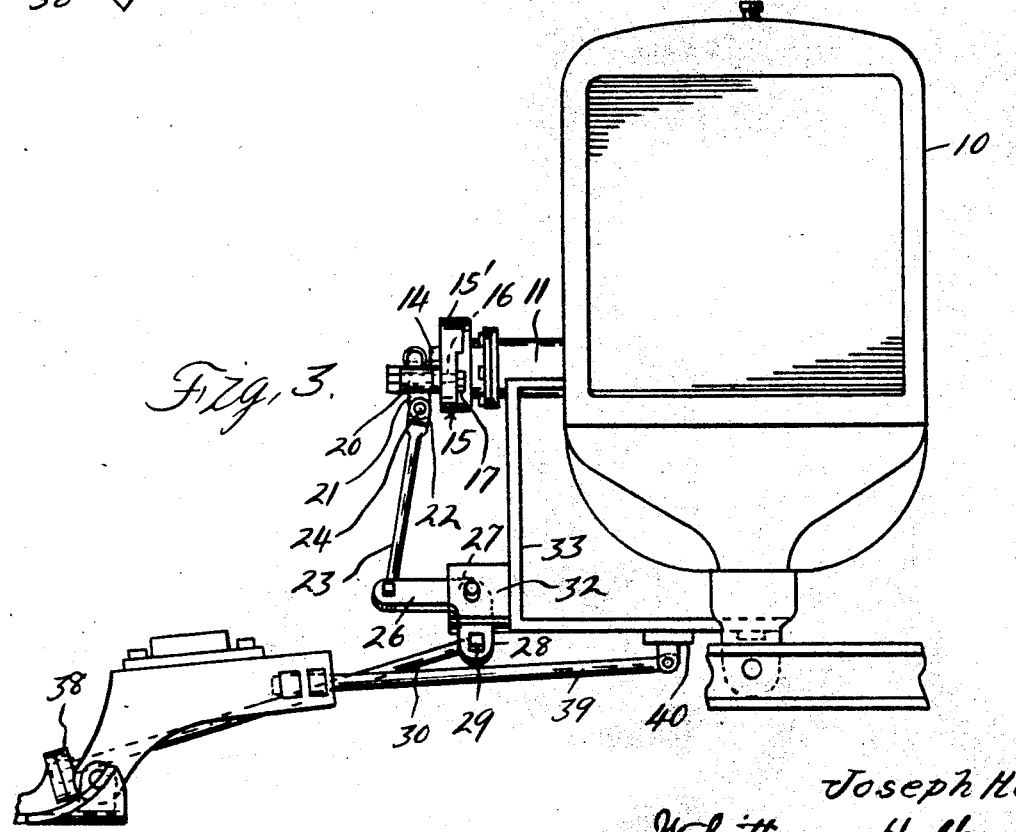
INVENTOR
Joseph Horste
BY Whittemore Hulbert
Whittemore & Belknap
ATTORNEYS Patented Mar. 24, 1931

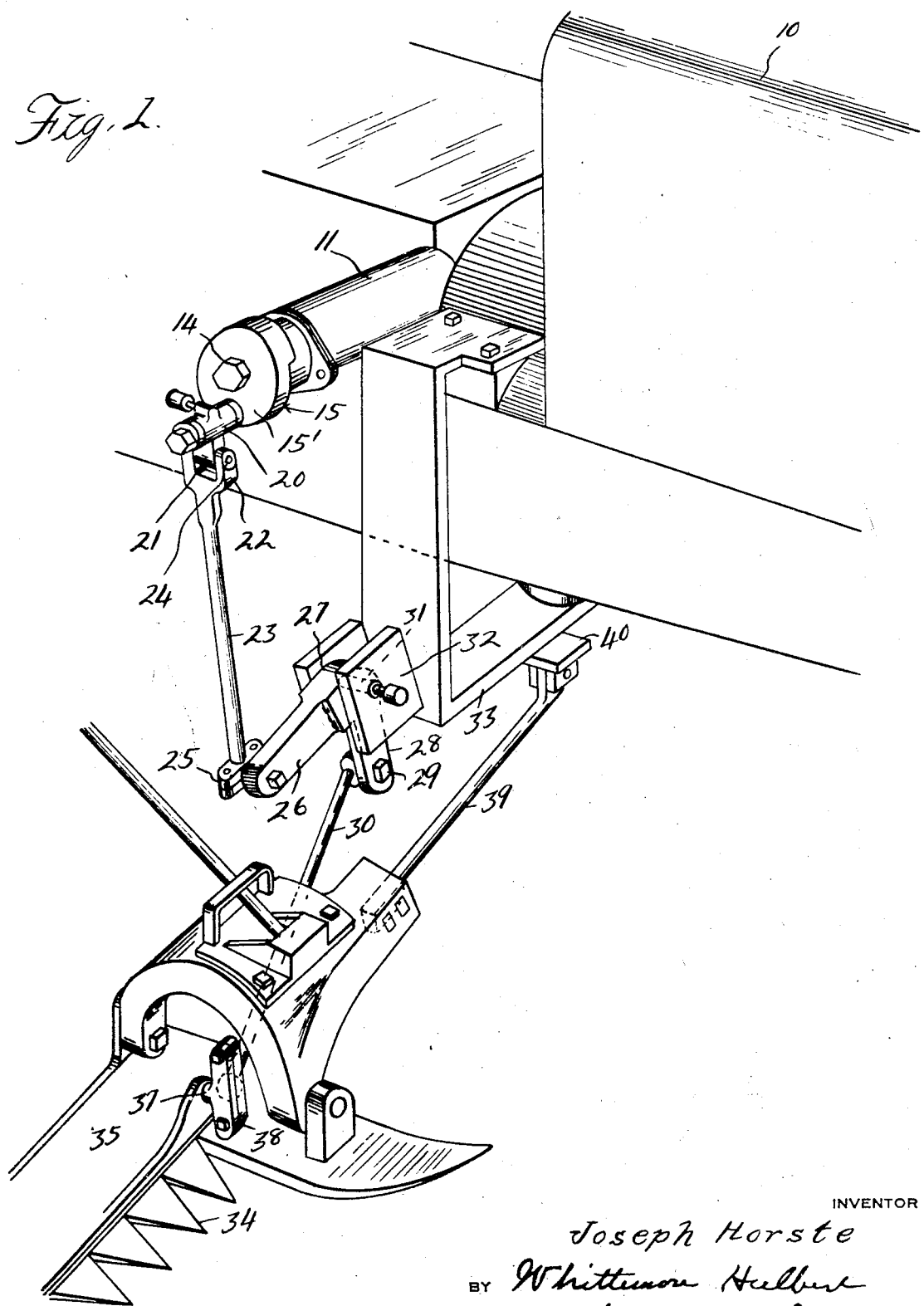

1,797,957

UNITED STATES PATENT OFFICE

JOSEPH HORSTE, OF DETROIT, MICHIGAN, ASSIGNOR TO DETROIT HARVESTER COMPANY, OF DETROIT, MICHIGAN, A CORPORATION OF MICHIGAN

DRIVING ATTACHMENT FOR TRACTORS

Application filed November 19, 1928. Serial No. 320,494.

This invention relates to attachments for tractors and the like and has particular reference to the means employed for driving the attachment from the conventional power take-off of the tractor or the like.

One of the primary objects of this invention is to provide an improved mechanism capable of converting the rotary movement of the power take-off to a reciprocable movement for driving the attachment.

A further object of the present invention is to provide a mechanism of the above type distinguished by its simplicity of construction and operation which not only enhances its value both mechanically and commercially, but provides a design which may be readily attached to a tractor or the like without altering any of the standard parts thereof.

Other objects and novel features of the invention, are attributed to the peculiar construction and arrangement of parts to be more fully hereinafter referred to.

In the drawings:

Figure 1 is a perspective view illustrating fragmentarily, a tractor and an attachment with my improved driving mechanism applied thereto;

Figure 2 is a fragmentary top plan view of the construction shown in Figure 1; and Figure 3 is a front elevational view of the tractor showing the attachment and driving mechanism therefor.

Referring now to the drawings, it will be noted that there is illustrated fragmentarily in Figure 1, a tractor 10 having the conventional power take-off mechanism illustrated generally at 11 and comprising the customary transmission drive shaft 12 having the threaded end 13. Keyed to the free end of the shaft and secured thereto by means of a suitable nut 14, is an eccentric 15 comprising a member 15′ having an opening 16 therein offset from the end of the shaft. Extending through the opening 16 and secured to the member 15′ by means of a nut 17, is a bolt 18 having an extended shank portion 19 constituting a journal for a bushing 20. The latter is freely rotatable about the shank portion 19 of the bolt and is provided with a depending ear 21 adapted to extend between the furcations 22 of a suitable connecting rod 23 and is pivotally connected to the furcations aforesaid by means of a bolt 24. The free end of the connecting rod is universally connected as at 25 to one arm 26 of a suitable bell crank lever 27 and the other arm 28 of the said lever is pivotally connected as at 29 to the attachment actuating rod 30. The hub portion of the bell crank lever 27 is journalled upon a stub 31 between the ears 32 projecting laterally from the base of a U-shaped bracket 33. The legs of the bracket are secured to the tractor 10 at any convenient point thereon.

The attachment herein shown for the purpose of illustration only, comprises a conventional mower having a series of cutters 34 carried by a suitable frame 35 which in turn is reciprocably carried by a frame 36. Journalled in one end of the frame 35 and extending transversely thereof, is a suitable shaft 37 universally connected to the free end of the actuating rod 30 by means of a coupling 38. The frame 36 is preferably pivotally connected to the tractor by means of a rod 39 having one end thereof rigidly secured to the frame and the opposite end pivotally secured to a plate 40 carried by the lower leg of the U-shaped bracket 33. The arrangement being such that the mower may be readily swung to a substantially vertical position when not in use. It will further be apparent from the foregoing that the entire attachment and driving mechanism therefor may be conveniently and readily removed from the tractor by merely detaching the U-shaped bracket 33 together with the member 15 upon the free end of the transmission drive shaft.

While it is believed that the operation of the attachment will be thoroughly understood from the foregoing description, a brief outline thereof is as follows: Reciprocation is imparted to the connecting rod 23 by means of the eccentric 15 and inasmuch as the lower end of the connecting rod is secured to the bell crank lever 27, the latter will be oscillated about the shaft 31. The bell crank imparts this oscillatory movement to the rod 30 which in turn is universally connected to the cutters 34. As a consequence the desired reciprocatory movement is imparted to the cutters.

The foregoing apparatus not only provides practical and efficient means for converting the rotary movement of the transmission drive shaft to a reciprocable movement of the attachment, but accomplishes this with a structure which is distinguished by its simplicity and its ability to be economically manufactured and assembled with facility. Furthermore with the present invention as noted above, the foregoing results are accomplished without the use of gear units or other complicated and inefficient driving connections between the tractor and attachment therefor.

While apparatus constructed and arranged substantially as herein illustrated and described somewhat in detail has been found to be entirely satisfactory in actual practice for driving a mower attachment, nevertheless it will be obvious to those skilled in this art that the driving mechanism illustrated herein may be used with equal facility in connection with various types of apparatus requiring a reciprocatory movement and accordingly the invention contemplates such an arrangement.

What I claim as my invention is:

1. The combination with a motor driven vehicle having a power take-off including a transmission drive shaft, of an attachment for the vehicle including a bracket secured to the vehicle, an eccentric secured to the shaft, a bell crank lever pivoted on the bracket, a connecting rod terminally connected to said eccentric and to an arm of said lever, a mower frame pivotally supported from the bracket, a reciprocating cutter bar carried by the mower frame, and a rod terminally connected to the cutter bar and to the other arm of the lever.

2. The combination with a motor driven vehicle having a power take-off including a transmission drive shaft, of an attachment for the vehicle including a bracket secured to the vehicle, an eccentric secured to the shaft, a bell crank lever carried by the bracket, a connecting rod terminally connected to said eccentric and to an arm of said lever, a mower frame connected to the vehicle, a reciprocating cutter bar carried by the mower frame, and a rod terminally connected to the cutter bar and to the other arm of the lever.

In testimony whereof I affix my signature.

JOSEPH HORSTE.